US008966257B2

(12) United States Patent
Tie et al.

(10) Patent No.: US 8,966,257 B2
(45) Date of Patent: Feb. 24, 2015

(54) METHOD AND SYSTEM FOR SECRET COMMUNICATION BETWEEN NODES

(75) Inventors: Manxia Tie, Shaanxi (CN); Jun Cao, Shaanxi (CN); Oin Li, Shaanxi (CN); Li Ge, Shaanxi (CN); Zhenhai Huang, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 324 days.

(21) Appl. No.: 13/516,967

(22) PCT Filed: Jun. 2, 2010

(86) PCT No.: PCT/CN2010/073454
§ 371 (c)(1),
(2), (4) Date: Jun. 18, 2012

(87) PCT Pub. No.: WO2011/072514
PCT Pub. Date: Jun. 23, 2011

(65) Prior Publication Data
US 2012/0278623 A1 Nov. 1, 2012

(30) Foreign Application Priority Data
Dec. 18, 2009 (CN) .......................... 2009 1 0219572

(51) Int. Cl.
*H04L 29/06* (2006.01)
*H04L 9/32* (2006.01)
*H04L 12/721* (2013.01)

(52) U.S. Cl.
CPC ........ *H04L 63/0464* (2013.01); *H04L 63/0435* (2013.01); *H04L 63/0471* (2013.01); *H04L 63/062* (2013.01); *H04L 63/162* (2013.01); *H04L 45/26* (2013.01)
USPC .......................................... 713/168; 713/150

(58) Field of Classification Search
CPC . H04L 63/0435; H04L 63/0464; H04L 45/26; H04L 63/062; H04L 63/162; H04L 63/0471
USPC ................................................. 713/150, 168
See application file for complete search history.

(56) References Cited

U.S. PATENT DOCUMENTS

2007/0230689 A1* 10/2007 Van Broeck .................... 380/30
2007/0258449 A1* 11/2007 Bennett ......................... 370/389

(Continued)

FOREIGN PATENT DOCUMENTS

| CN | 1599357 A | 3/2005 |
|---|---|---|
| CN | 101052029 A | 10/2007 |

(Continued)

OTHER PUBLICATIONS

Request for Comments: 4728 The Dynamic Source Routing Protocol (DSR) for Mobile Ad Hoc Networks for IPv4 Feb. 2007.*

(Continued)

*Primary Examiner* — Kambiz Zand
*Assistant Examiner* — Benjamin Kaplan
(74) *Attorney, Agent, or Firm* — Greer Burns & Crain Ltd.

(57) ABSTRACT

The present invention discloses a method and system for secret communication between nodes in a wired Local Area Network (LAN). The method of secret communication between nodes in the wired LAN includes the following steps: 1) a sharing key is established; 2) the route probe is exchanged; 3) the data communication is classified; 4) the secret communication is processed among the nodes. According to the different communication situations among the nodes, the method of secret communication between nodes provided in the present invention can process the classification and select an appropriate secret communication strategy; compared with per-hop encryption, the calculation load of the exchange equipment is reduced, and the transmission delay of data packets is shortened; compared with the method that inter-station keys are established in pairs of nodes in order to protect the communication secret, the key number is reduced, and the key management is simplified.

15 Claims, 7 Drawing Sheets

(56) References Cited

U.S. PATENT DOCUMENTS

2009/0307307 A1* 12/2009 Igarashi ................... 709/203
2011/0103374 A1* 5/2011 Lajoie et al. ............... 370/352

FOREIGN PATENT DOCUMENTS

| | | | |
|---|---|---|---|
| CN | 101068206 A | 11/2007 | |
| CN | 101127597 A | 2/2008 | |
| CN | 101155024 A | 4/2008 | |
| CN | 101594271 A | 12/2009 | |
| EP | 1 475 926 | 11/2004 | |
| JP | 11-239176 | 8/1999 | |
| JP | 2008-154103 | 7/2008 | |
| JP | 2008-259148 | 10/2008 | |

OTHER PUBLICATIONS

International Search Report issued in PCT/CN2010/073454, mailed Sep. 30, 2010.

* cited by examiner

METHOD AND SYSTEM FOR SECRET COMMUNICATION BETWEEN NODES

This application is a US National Stage of International Application No. PCT/CN/073454, filed on Jun. 2, 2010, designating the United States, and claims claiming the benefit of Chinese Patent Application no. 200910219572.8, filed with the Chinese Patent Office on Dec. 18, 2009 and entitled "Method and system for secure communication between nodes", which is hereby incorporated by reference in its entirety.

FIELD OF THE INVENTION

The present invention relates to the field of network security and particularly to a method and system for secure communication between nodes.

BACKGROUND OF THE INVENTION

A wired local area network is typically a broadcast network where data transmitted from a node can be received by all the other nodes. The respective nodes over the network share a channel, thus posing a tremendous hidden trouble of security to the network. An attacker can capture all data packets over the network simply by accessing and listening to the network. A Local Area Network (LAN) defined in the existing national standard GB/T 15629.3 (corresponding IEEE 802.3 or ISO/IEC 8802-3) has no data secure method available, so that the attacker may steal crucial information easily.

In the wired local area network, the IEEE secures the link layer by enhancing the security of the IEEE 802.3. The IEEE 802.1AE provides a data encryption protocol to protect the Ethernet and takes a security measure with hop-by-hop encryption to secure a delivery of data between the nodes of the network. This security measure brings a considerable calculation load on a switching device in the local area network, thus easily resulting in an attack of the attacker to the switching device; and also a data packet will be transported from a transmission source node to a destination node with a larger delay, thus lowering the efficiency of transmission over the network.

A topology of the wired local area network is relatively complex and also involves a large number of nodes (here a terminal and a switching device are referred collectively to as a node), so data communication in the network is relatively complex. If a shared key is created between every two nodes, then the nodes have to store a relatively large number of shared keys; and if a shared key between adjacent nodes is used with the security measure with hop-by-hop encryption, then the switching device of the network may suffer from a considerable calculation load.

Therefore it is desired to study a method to address the issue of secure communication between nodes, thereby ensuring secure transmission of data between nodes on one hand and lowering the number of keys and the complexity of creating a key as much as possible on the other hand while taking a encryption and decryption capability of a node into account.

SUMMARY OF THE INVENTION

In order to address the foregoing problem present in the prior art, the invention provides a method and system for secure communication between nodes by categorizing data communication based upon information on a switching route between nodes and selecting a different secure communication strategy.

In a technical solution of the invention, the invention provides a method for secure communication between nodes, wherein the method for secure communication between nodes includes the following four processes:

1) creating a shared key between nodes including between a terminal and a switching device, between every two switching devices and between two terminals directly connected to the same switching device;

2) seeking a switching route between the nodes to obtain information on the switching route between the nodes;

3) determining the type of data communication between the nodes according to the information on the switching route; and 4) performing secure communication between the nodes by using a different secure communication strategy according to a different type of data communication between the nodes.

Preferably the step 1) is performed by:

1.1) creating a shared key referred to as a Unicast Session Key, USK, between adjacent nodes;

1.2) creating a shared key referred to as a SWitch key, SWkey, between every two switching devices; and 1.3) creating a shared key referred to as a station key, STAkey, between two terminals directly connected to the same switching device according to a selected local strategy.

Preferably information on a switching route from a transmission source node $N_{Source}$ to a destination node $N_{Destination}$ is defined as a four-tuple of identifiers, wherein the packet generally includes the four-tuple of identifiers including $ID_{Source}$, $ID_{SW\text{-}first}$, $ID_{SW\text{-}last}$ and $ID_{Destination}$; a switching device which receives a data packet from the transmission source node $N_{Source}$ to the destination node $N_{Destination}$ but is absent in the four-tuple of identifiers of the information on the switching route is referred to as an intermediate switching device, and data from the transmission source node $N_{Source}$ to the destination node $N_{Destination}$ may not pass through any intermediate switching device or may pass through a plurality of intermediate switching devices during transmission; and Preferably the step 2) is performed by:

2.1) the transmission source node $N_{Source}$ transmitting a switching route seeking packet to the destination node $N_{Destination}$, wherein the packet generally includes the four-tuple of identifiers including $ID_{Source}$, $ID_{SW\text{-}first}$, $ID_{SW\text{-}last}$ and $ID_{Destination}$;

wherein:

$ID_{Source}$: represents the identifier of the transmission source node $N_{Source}$;

$ID_{SW\text{-}first}$: represents the identifier of the first switching device SW-first through which the data packet from the transmission source node $N_{Source}$ to the destination node $N_{Destination}$ passes, and if the transmission source node $N_{Source}$ is a switching device, then $ID_{SW\text{-}first}$ is $ID_{Source}$; and if the transmission source node $N_{Source}$ is a terminal, then $ID_{SW\text{-}first}$ is the identifier of a switching device directly connected to the transmission source node $N_{Source}$;

$ID_{SW\text{-}last}$: represents the identifier of a last switching device SW-last through which the data packet from the transmission source node $N_{Source}$ to the destination node $N_{Destination}$ passes, and this field is unknown in the switching route seeking packet; and $ID_{Destination}$: represents the identifier of the destination node $N_{Destination}$;

2.2) the destination node $N_{Destination}$ transmitting a switching route response packet to the transmission source node $N_{Source}$; and 2.3) the respective nodes receiving the switching route response packet.

Preferably after the destination node $N_{Destination}$ receives the switching route seeking packet transmitted from the transmission source node $N_{Source}$, the step 2.2) is performed by:

2.2.1) determining information on the last switching device SW-last through which the data packet transmitted from the transmission source node $N_{Source}$ passes: if the destination node $N_{Destination}$ is a switching device, then $ID_{SW-last}$ is $ID_{Destination}$; and if the destination node $N_{Destination}$ is a terminal, then $ID_{SW-last}$ is the identifier of a switching device directly connected to the terminal;

2.2.2) recording the four-tuple of identifiers, wherein $ID_{Source}$, $ID_{SW-first}$ and $ID_{Destination}$ are of the same values of respective fields in the received switching route seeking packet, and at this time the values of all the fields of the four-tuple have been definite, wherein the four-tuple of identifiers includes $ID_{Source}$, $ID_{SW-first}$, $ID_{SW-last}$ and $ID_{Destination}$; and 2.2.3) constructing and transmitting a switching route response packet to the transmission source node $N_{Source}$, wherein the packet includes the four-tuple of identifiers with the definite values of all the fields, wherein the four-tuple of identifiers includes $ID_{Source}$, $ID_{SW-first}$, $ID_{SW-last}$ and $ID_{Destination}$.

Preferably after the respective nodes receive the switching route response packet transmitted from the destination node $N_{Destination}$, the step 2.3) is performed by:

2.3.1) the switching device receiving the switching route response packet, and recording the four-tuple of identifiers and then forwarding the packet if its own identifier is present in the four-tuple of identifiers in the packet or directly forwarding the packet if its own identifier is absent in the four-tuple of identifiers in the packet, wherein the four-tuple of identifiers includes $ID_{Source}$, $ID_{SW-first}$, $ID_{SW-last}$ and $ID_{Destination}$; and 2.3.2) the transmission source node $N_{Source}$ recording the four-tuple of identifiers upon reception of the switching route response packet to thereby finish the current switching route seeking process, wherein the four-tuple of identifiers includes $ID_{Source}$, $ID_{SW-first}$, $ID_{SW-last}$ and $ID_{Destination}$.

Preferably the step 3) is performed by:

determining the type of data communication from the transmission source node $N_{Source}$ to the destination node $N_{Destination}$ according to the obtained information on the four-tuple, including $ID_{Source}$, $ID_{SW-first}$, $ID_{SW-last}$ and $ID_{Destination}$, of the switching route, by:

3.1) determining whether $ID_{SW-first}=ID_{Source}$ holds, and if so, then the transmission source node $N_{Source}$ being a switching device, and performing the step 3.2); otherwise, then the transmission source node $N_{Source}$ being a terminal, and performing the step 3.4);

3.2) determining whether $ID_{SW-last}=ID_{Destination}$ holds, and if so, then the destination node $N_{Destination}$ being a switching device, and data communication from the transmission source node $N_{Source}$ to the destination node $N_{Destination}$ being communication from a switching device to a switching device and belonging to the type of communication from a switching device to a switching device; otherwise, the destination node $N_{Destination}$ being a terminal, and performing the step 3.3);

3.3) determining whether $ID_{SW-last}=ID_{SW-first}$ holds, and if so, then data from the transmission source node $N_{Source}$ to the destination node $N_{Destination}$ passing through only one switching device, and data communication from the transmission source node $N_{Source}$ to the destination node $N_{Destination}$ being communication from a switching device to a terminal directly connected to the switching device and belonging to the type of communication from a switching device to a terminal directly connected to the switching device; otherwise, data from the transmission source node $N_{Source}$ to the destination node $N_{Destination}$ passing through more than two switching devices, and data communication from the transmission source node $N_{Source}$ to the destination node $N_{Destination}$ being communication from a switching device to a terminal indirectly connected to the switching device and belonging to the type of communication from a switching device to a terminal indirectly connected to the switching device;

3.4) determining whether $ID_{SW-last}=ID_{Destination}$ holds, and if so, then the destination node $N_{Destination}$ being a switching device, and performing the step 3.5); otherwise, the destination node $N_{Destination}$ being a terminal, and performing the step 3.6);

3.5) determining whether $ID_{SW-last}=ID_{SW-first}$ holds, and if so, then data from the transmission source node $N_{Source}$ to the destination node $N_{Destination}$ passing through only one switching device, and data communication from the transmission source node $N_{Source}$ to the destination node $N_{Destination}$ being communication from a terminal to a switching device directly connected to the terminal and belonging to the type of communication from a terminal to a switching device directly connected to the terminal; otherwise, data from the transmission source node $N_{Source}$ to the destination node $N_{Destination}$ passing through more than two switching devices, and data communication from the transmission source node $N_{Source}$ to the destination node $N_{Destination}$ being communication from a terminal to a switching device indirectly connected to the terminal and belonging to the type of communication from a terminal to a switching device indirectly connected to the terminal; and 3.6) determining whether $ID_{SW-last}=ID_{SW-first}$ holds, and if so, then data from the transmission source node $N_{Source}$ to the destination node $N_{Destination}$ passing through only one switching device, and data communication from the transmission source node $N_{Source}$ to the destination node $N_{Destination}$ being communication from a terminal to another terminal directly connected to the same switching device and belonging to the type of communication from a terminal to another terminal directly connected to the same switching device; otherwise, data from the transmission source node $N_{Source}$ to the destination node $N_{Destination}$ passing through more than two switching devices, and data communication from the transmission source node $N_{Source}$ to the destination node $N_{Destination}$ being communication from a terminal to another terminal directly connected to a different switching device and belonging to the type of communication from a terminal to another terminal directly connected to a different switching device.

Preferably the process 4) is performed by adopting a different secure communication strategy during communication for data communication between the transmission source node $N_{Source}$ and the destination node $N_{Destination}$ according to a different type of data communication.

Preferably the type of data communication is the type of communication from a switching device to a switching device, the strategy of secure communication between nodes is performed by:

4.1.1) the transmitting source node $N_{Source}$ encrypting the data packet using the switch key shared between the transmitting source node $N_{Source}$ and the destination node $N_{Destination}$, wherein the transmitting source node $N_{Source}$ is a switching device which is both the transmitting source node $N_{Source}$ and the first switching device SW-first, and the destination node $N_{Destination}$ is a switching device which is both the destination node $N_{Destination}$ and the last switching device SW-last;

4.1.2) if there is intermediate switching device, then the intermediate switching device receiving and directly forwarding the communication data packet of the type of communication from a switching device to a switching device; and 4.1.3) the destination node $N_{Destination}$ decrypting the data packet using the switch key shared between the transmitting source node $N_{Source}$ and the destination node $N_{Destination}$.

Preferably when the type of data communication is the type of communication from a switching device to a terminal directly connected to the terminal, the strategy of secure communication between nodes is performed by:

4.2.1) the transmitting source node $N_{Source}$ encrypting the data packet using the unicast session key shared between the transmitting source node $N_{Source}$ and the destination node $N_{Destination}$, wherein the transmitting source node $N_{Source}$ is a switching device which is both the transmitting source node $N_{Source}$ and the first switching device SW-first and also the last switching device SW-last, and the destination node $N_{Destination}$ is a terminal; and 4.2.2) the destination node $N_{Destination}$ decrypting the data packet using the unicast session key shared between the transmitting source node $N_{Source}$ and the destination node $N_{Destination}$.

Preferably when the type of data communication is the type of communication from a switching device to a terminal indirectly connected to the switching device, the strategy of secure communication between nodes is performed by:

4.3.1) the transmitting source node $N_{Source}$ encrypting the data packet using the switch key shared between the transmitting source node $N_{Source}$ and the last switching device SW-last, wherein here the transmitting source node $N_{Source}$ is a switching device which is both the transmitting source node $N_{Source}$ and the first switching device SW-first;

4.3.2) if there is intermediate switching device, then the intermediate switching device directly forwarding the data packet of the type of communication from a switching device to a terminal indirected connected to the switching device;

4.3.3) the last switching device SW-last decrypting the data packet using the switch key shared between the transmission source node $N_{Source}$ and the last switching device SW-last, then encrypting the data packet using the unicast session key shared between the last switching device SW-last and the destination node $N_{Destination}$ and then forwarding the data packet, wherein the destination node $N_{Destination}$ is a terminal; and 4.3.4) the destination node $N_{Destination}$ decrypting the data packet using the unicast session key shared between the last switching device SW-last and the destination node $N_{Destination}$.

Preferably when the type of data communication is the type of communication from a terminal to a switching device directly connected to the terminal, the strategy of secure communication between nodes is performed by:

4.4.1) the transmission source node $N_{Source}$ encrypting the data packet using the unicast session key shared between the transmission source node $N_{Source}$ and the destination node $N_{Destination}$, wherein the transmission source node $N_{Source}$ is a terminal, and the destination node $N_{Destination}$ is a switching device which is both the destination node $N_{Destination}$ and the first switching device SW-first and also the last switching device SW-last; and 4.4.2) the destination node $N_{Destination}$ decrypting the data packet using the unicast session key shared between the transmission source node $N_{Source}$ and the destination node $N_{Destination}$.

Preferably when the type of data communication is the type of communication from a terminal to a switching device indirectly connected to the terminal, the strategy of secure communication between nodes is performed by:

4.5.1) the transmitting source node $N_{Source}$ encrypting the data packet using the unicast session key shared between the transmitting source node $N_{Source}$ and the first switching device SW-first, wherein the transmitting source node $N_{Source}$ is a terminal;

4.5.2) the first switching device SW-first decrypting the data packet using the unicast session key shared between the transmission source node $N_{Source}$ and the first switching device SW-first, then encrypting the data packet using the switch key shared between the first switching device SW-first and the destination node $N_{Destination}$ and then forwarding the data packet, wherein the destination node $N_{Destination}$ is a switching device which is both the destination node $N_{Destination}$ and the last switching device SW-last;

4.5.3) if there is intermediate switching device, then the intermediate switching device directly forwards the data packet of the type of communication from a terminal to a switching device indirectly connected to the terminal; and 4.5.4) the destination node $N_{Destination}$ decrypting the data packet using the switch key shared between the destination node $N_{Destination}$ and the first switching device SW-first.

Preferably when the type of data communication is the type of communication from a terminal to another terminal directly connected to the same switching device, the strategy of secure communication between nodes is performed by:

4.6.1) adopting a secure communication strategy as follows for the type of communication from a terminal to another terminal directly connected to the same switching device with a created station key:

4.6.1.1) the transmission source node $N_{Source}$ encrypts the data packet using the station key shared between the transmission source node $N_{Source}$ and the destination node $N_{Destination}$, wherein the destination node $N_{Destination}$ is a terminal;

4.6.1.2) the first switching device SW-first directly forwards the data packet of the type of communication from a terminal to another terminal directly connected to the same switching device, wherein the first switching device SW-first is also the last switching device SW-last; and 4.6.1.3) the destination node $N_{Destination}$ decrypts the data packet using the station key shared between the transmission source node $N_{Source}$ and the destination node $N_{Destination}$; and 4.6.2) adopting a secure communication strategy as follows for the type of communication from a terminal to another terminal directly connected to the same switching device without any created station key:

4.6.2.1) the transmission source node $N_{Source}$ encrypts the data packet using the unicast session key shared between the transmission source node $N_{Source}$ and a switching device directly connected to the transmission source node $N_{Source}$;

4.6.2.2) the first switching device SW-first decrypts the data packet using the unicast session key shared between the transmission source node $N_{Source}$ and the first switching device SW-first, then encrypts the data packet using the unicast session key shared between the first switching device SW-first and the destination node $N_{Destination}$ and then forwards data packet, wherein the first switching device SW-first is also the last switching device SW-last; and 4.6.2.3) the destination node $N_{Destination}$ decrypts the data packet using the unicast session key shared between the destination node $N_{Destination}$ and the switching device directly connected to the destination node $N_{Destination}$.

Preferably wherein when the type of data communication is the type of communication from a terminal to another terminal directly connected to a different switching device, the strategy of secure communication between nodes is performed by:

4.7.1) the transmission source node $N_{Source}$ encrypting the data packet using the unicast session key shared between the transmission source node $N_{Source}$ and the first switching device SW-first, wherein the transmission source node $N_{Source}$ is a terminal;

4.7.2) the first switching device SW-first decrypting the data packet using the unicast session key shared between the transmission source node $N_{Source}$ and the first switching device SW-first, then encrypting the data packet using the switch key shared between the first switching device SW-first and the last switching device SW-last and then forwarding the data packet;

4.7.3) if there is intermediate switching device, then the intermediate switching device directly forwarding the data packet of the type of communication from a terminal to another terminal directly connected to a different switching device;

4.7.4) the last switching device SW-last decrypting the data packet using the switch key shared between the first switching device SW-first and the last switching device SW-last, then encrypting the data packet using the unicast session key shared between the last switching device SW-last and the destination node $N_{Destination}$ and then forwarding the data packet, wherein the destination node $N_{Destination}$ a terminal; and 4.7.5) the destination node $N_{Destination}$ decrypting the data packet using the unicast session key shared between the last switching device SW-last and the destination node $N_{Destination}$.

The invention further provides a system for secure communication between nodes, the system includes a transmission source node $N_{Source}$, a first switching device SW-first, a second switching device SW-last and a destination node $N_{Destination}$, wherein:

the transmission source node $N_{Source}$ is configured to transmit a switching route seeking packet and an encrypted data packet to the destination node $N_{Destination}$, to receive a switch route response packet transmitted from the destination node $N_{Destination}$, and to record information on a switching route from the transmission source node $N_{Source}$ to the destination node $N_{Destination}$;

the first switching device SW-first is configured to forward the data packet from the transmission source node $N_{Source}$ to the destination node $N_{Destination}$ and to record the information on the switching route from the transmission source node $N_{Source}$ to the destination node $N_{Destination}$;

the second switching device SW-last is configured to forward the data packet from the transmission source node $N_{Source}$ to the destination node $N_{Destination}$ and to record the information on the switching route from the transmission source node $N_{Source}$ to the destination node $N_{Destination}$; and the destination node $N_{Destination}$ is configured to receive the switching route seeking packet and the encrypted data packet transmitted from the transmission source node $N_{Source}$, to transmit the switching route response packet to the transmission source node $N_{Source}$, and to record the information on the switching route from the transmission source node $N_{Source}$ to the destination node $N_{Destination}$;

wherein the information on the switching route from the transmission source node $N_{Source}$ to the destination node $N_{Destination}$ includes $ID_{Source}$, $ID_{SW-first}$, $ID_{SW-last}$ and $ID_{Destination}$.

The system further includes an intermediate switching device configured to transmit transparently all data packets from the transmission source node $N_{Source}$ to the destination node $N_{Destination}$.

The invention has such advantages that the method and system for secure communication between nodes in a wired local network according to the invention can create a shared key between adjacent nodes, a shared key between every two switching devices and a shared key between every two terminals directly connected to the same switching device, obtain information on a switching route between nodes in a process of seeking the switching route, determine the type of data communication between two nodes and thereby select a corresponding secure communication strategy. The method and system according to the invention can categorize data communication based upon information on a switching route and adopt a different secure communication strategy for a different type of data communication. A calculation load of a switching device can be reduced and a delay of transmitting a data packet can be shortened as compared with hop-by-hop encryption; and the number of keys can be reduced and key management can be simplified as compared with the method for securing communication confidentiality by creating station keys between every two nodes.

BRIEF DESCRIPTION OF THE DRAWINGS

FIG. 6-b is a schematic diagram of communication (non-adjacent) of a switching device to a switching device according to the invention;

FIG. 11-b is a schematic diagram of communication (without any created station key) of a terminal to another terminal directly connected to the same switching device according to the invention.

DETAILED DESCRIPTION OF THE EMBODIMENTS

A node N in the invention refers to a terminal STA (STAtion) and a switching device SW (Switch) in a network. A hub or another physical layer device performs no node process.

"Directly connect" defined in the invention refers to such a connection relationship that switching devices or a switching device and a terminal are directly connected through physical layer device such as a network line, a hub, etc. The connection between nodes through other devices isn't a direct connection relationship.

Referring to FIG. 1 to FIG. 12, a method for secure communication between nodes in a wired local area network according to the invention generally includes four processes of creating a shared key, seeking a switching route, categorizing data communication and secure communication between nodes. A particular implementation thereof is as follows:

1) A shared key is created, that is, a shared key is created between nodes including between a terminal and a switching device, between every two switching devices and between two terminals directly connected to the same switching device, and particularly:

1.1) A shared key referred to as a Unicast Session Key (USK) is created between adjacent nodes;

1.2) A shared key referred to as a SWkey (SWitch key) is created between every two switching devices, where a unicast session key between adjacent switching devices is a switch key between them; and 1.3) A shared key referred to as a station key STAkey (STAtion key) is created between two terminals directly connected to the same switching device according to a selected local strategy.

Figure 1:
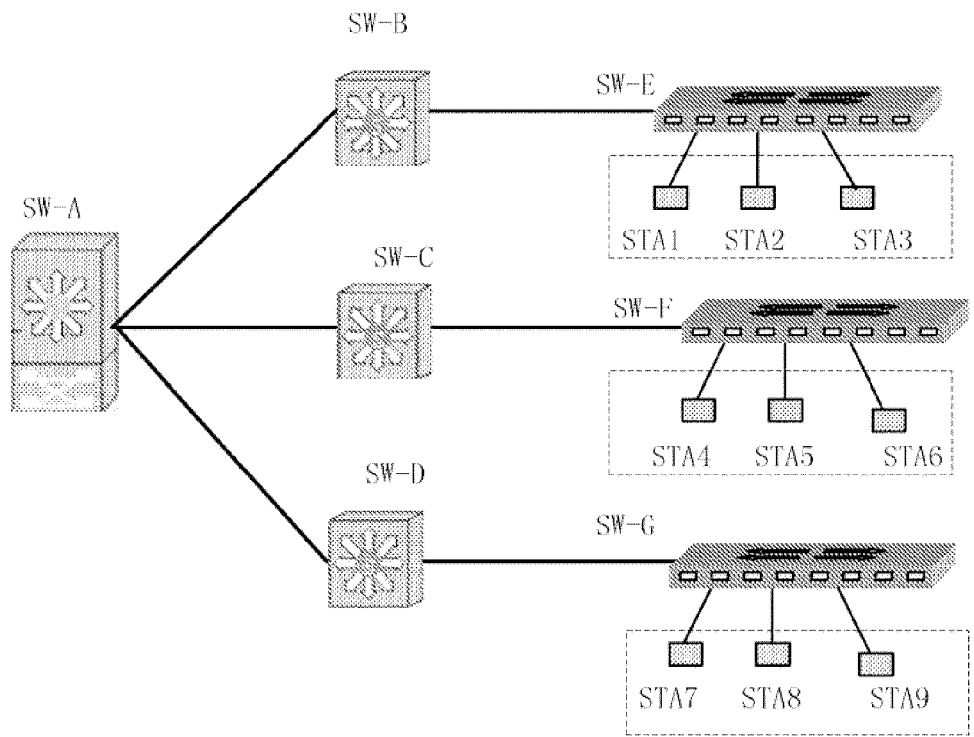
FIG. 1 is a schematic diagram of a general architecture of a local area network according to the invention.

A general architecture of a local area network is as illustrated in FIG. 1. There is a unicast session key USK between all the adjacent nodes, for example, between adjacent switching devices SW-A and SW-B and between a switching device SW-E and a terminal STA2 which are adjacent; there is a switch key SWkey between every two switching devices, for example, between adjacent switching devices SW-B and SW-E and between nonadjacent switching devices SW-E and SW-G; and a station key STAkey can be created between terminals STAs directly connected to the same switching device, for example, between terminals STA1 and STA2 and between terminals STA7 and STA9. Particularly a unicast session key and a switch key are created upon successful access of a node to the network, and whether to create a station key is decided by a transmission source node $N_{Source}$ according to a local strategy upon occurrence of communication. Typically if the terminal STA1 transmits a relatively large amount of data to the other terminal STA2 directly connected to the same switching device, then a station key is required to be created; and if there is just simple data packet information to be transmitted, then no station key is required to be created. A unicast session key, a switch key and a station key can be created in a pre-distribution or certain security mechanism, and a particular creation method thereof will not be limited or defined in the invention.

2) A switching route is sought, that is, a switching route is sought between the nodes to obtain information on the switching route between the nodes, and particularly:

Information on an inter-node switching route from a transmission source node $N_{Source}$ to a destination node $N_{Destination}$ is defined as a four-tuple of identifiers:

$$[ID_{Source}, ID_{SW\text{-}first}, ID_{SW\text{-}last}, ID_{Destination}]$$

Where:

$ID_{Source}$: represents the identifier of the transmission source node $N_{Source}$ which can be a terminal or a switching device;

$ID_{SW\text{-}first}$: represents the identifier of a first switching device SW-first through which a data packet from the transmission source node $N_{Source}$ to the destination node $N_{Destination}$ passes;

$ID_{SW\text{-}last}$: represents the identifier of a last switching device SW-last through which the data packet from the transmission source node $N_{Source}$ to the destination node $N_{Destination}$ passes; and $ID_{Destination}$: represents the identifier of the destination node $N_{Destination}$ which can be a terminal or a switching device.

Figure 2:
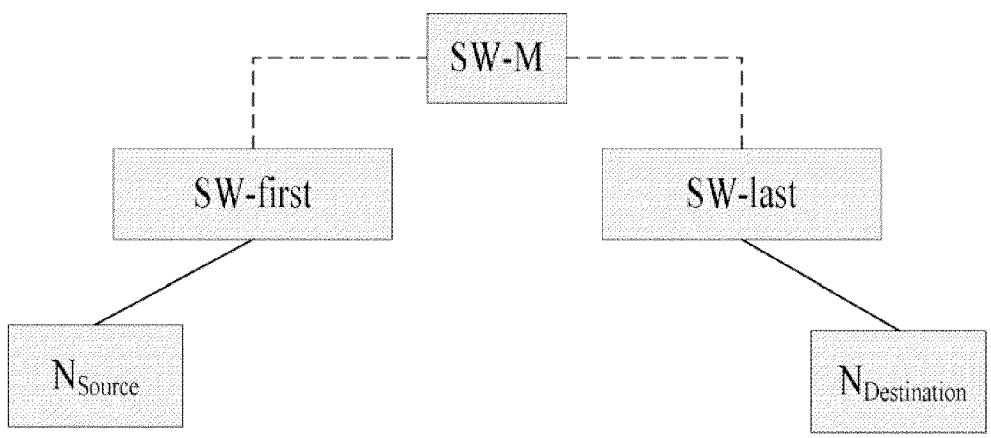
FIG. 2 is a schematic diagram of a network structure of a switching route between nodes according to the invention.

A network structure corresponding to the information on the switching route from the transmission source node $N_{Source}$ to the destination node $N_{Destination}$, i.e., $[ID_{Source}, ID_{SW\text{-}first}, ID_{SW\text{-}last}, ID_{Destination}]$, is as illustrated in FIG. 2. Particularly a switching device which receives the data packet from the transmission source node $N_{Source}$ to the destination node $N_{Destination}$ but is absent in the four-tuple of identifiers of the information on the switching route is referred to as an intermediate switching device. Data from the transmission source node $N_{Source}$ to the destination node $N_{Destination}$ may not pass through any intermediate switching device or may pass a plurality of intermediate switching devices during transmission.

Figure 3:
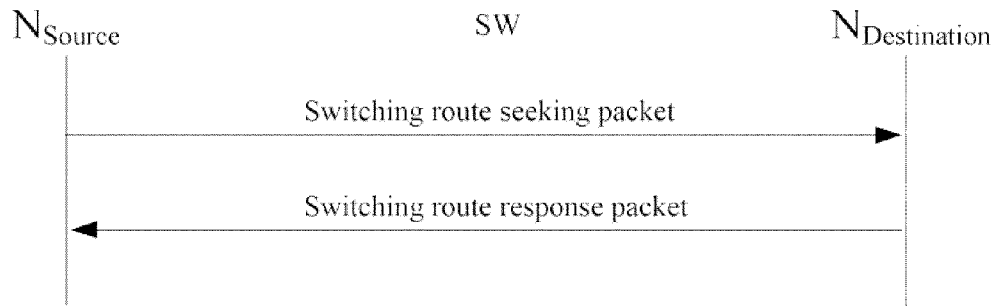
FIG. 3 is a schematic diagram of a switching route seeking protocol according to the invention.
Figure 4:
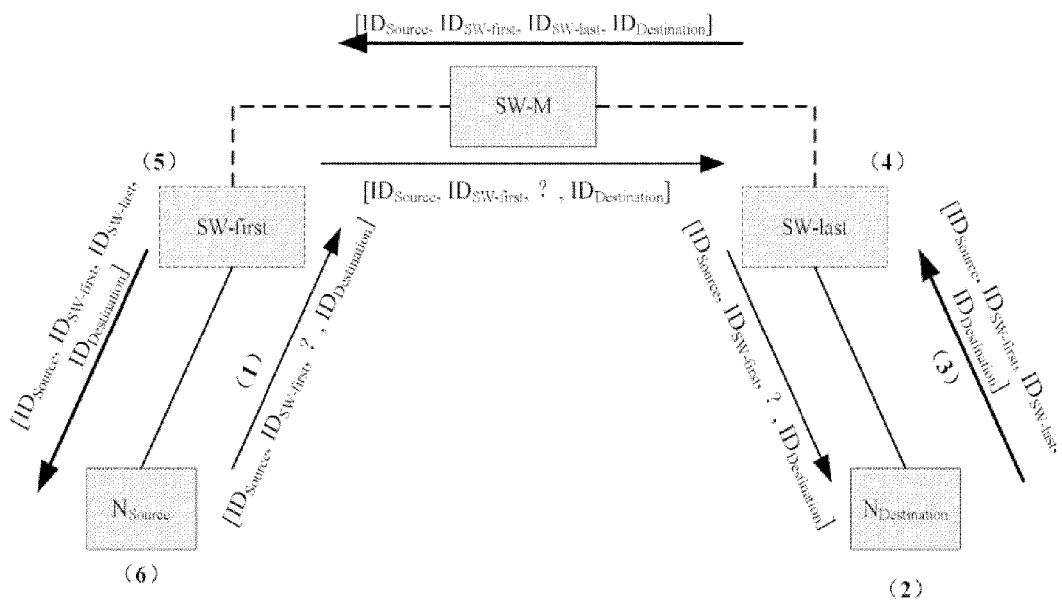
FIG. 4 is a schematic diagram of a process of seeking a switching route between nodes according to the invention.

In the network, a process of seeking a switching route is required to be initiated to know the information on the switching route from the node $N_{Source}$ to the node $N_{Destination}$. As illustrated in FIG. 3, seeking of a switching route includes a switching route seeking packet and a switching route response packet. A specific description of the process of seeking a switching route is as illustrated in FIG. 4.

2.1) The transmission source node $N_{Source}$ transmits a switching route seeking packet to the destination node $N_{Destination}$;

The transmission source node $N_{Source}$ constructs and transmits a switching route seeking packet to the destination node $N_{Destination}$, and the packet generally includes the four-tuple of identifiers:

$$[ID_{Source}, ID_{SW\text{-}first}, ID_{SW\text{-}last}, ID_{Destination}]$$

Where:

$ID_{Source}$: represents the identifier of the transmission source node $N_{Source}$;

$ID_{SW\text{-}first}$: represents the identifier of a first switching device SW-first through which a data packet from the transmission source node $N_{Source}$ to the destination node $N_{Destination}$ passes, and if the transmission source node $N_{Source}$ is a switching device, then $ID_{SW\text{-}first}$ is $ID_{Source}$; and if the transmission source node $N_{Source}$ is a terminal, then $ID_{SW\text{-}first}$ is the identifier of a switching device directly connected to the transmission source node $N_{Source}$;

$ID_{SW\text{-}last}$: represents the identifier of a last switching device SW-last through which the data packet from the transmission source node $N_{Source}$ to the destination node $N_{Destination}$ passes, and this field is unknown (represented as a question mark ("?") in FIG. 4) in the switching route seeking packet; and $ID_{Destination}$: represents the identifier of the destination node $N_{Destination}$;

2.2) The destination node $N_{Destination}$ transmits a switching route response packet to the transmission source node $N_{Source}$;

The destination node $N_{Destination}$ performs the following processes upon reception of the switching route seeking packet transmitted from the transmission source node $N_{Source}$:

2.2.1) It determines information on the last switching device SW-last through which the data packet transmitted from the transmission source node $N_{Source}$ passes: if the destination node $N_{Destination}$ is a switching device, then $ID_{SW\text{-}last}$ is $ID_{Destination}$; and if the destination node $N_{Destination}$ is a terminal, then $ID_{SW\text{-}last}$ is the identifier of a switching device directly connected to the terminal;

2.2.2) It records the four-tuple of identifiers [$ID_{Source}$, $ID_{SW\text{-}first}$, $ID_{SW\text{-}last}$, $ID_{Destination}$], where $ID_{Source}$, $ID_{SW\text{-}first}$ and $ID_{Destination}$ are of the same values of respective fields in the received switching route seeking packet, and at this time the values of all the fields of the four-tuple have been definite; and 2.2.3) It constructs and transmits a switching route response packet to the transmission source node $N_{Source}$, and the packet generally includes the four-tuple of identifiers [$ID_{Source}$, $ID_{SW\text{-}first}$, $ID_{SW\text{-}last}$, $ID_{Destination}$] with the definite values of all the fields;

2.3) The respective nodes receive the switching route response packet;

2.3.1) Upon reception of the switching route response packet, the switching device records the four-tuple of identifiers [$ID_{Source}$, $ID_{SW\text{-}first}$, $ID_{SW\text{-}last}$, $ID_{Destination}$] and then forwards the packet if its own identifier is present in the four-tuple of identifiers in the packet or directly forwards the packet if its own identifier is absent in the four-tuple of identifiers in the packet; and 2.3.2) The transmission source node $N_{Source}$ records the four-tuple of identifiers [$ID_{Source}$, $ID_{SW\text{-}first}$, $ID_{SW\text{-}last}$, $ID_{Destination}$] upon reception of the switching route response packet to thereby finish the current switching route seeking process;

The information on the switching route from the transmission source node $N_{Source}$ to the destination node $N_{Destination}$ is recorded only by the transmission source node $N_{Source}$, the first switching device SW-first, the last switching device SW-last and the destination node $N_{Destination}$ throughout the network. If the transmission source node $N_{Source}$ is a switching device, then the transmission source node itself is the first switching device SW-first through which the data packet from the transmission source node $N_{Source}$ to the destination node $N_{Destination}$ passes, that is, SW-first is $N_{Source}$; and if the destination node $N_{Destination}$ is a switching device, then the $N_{Destination}$ is the last switching device SW-last through which the data packet from the transmission source node $N_{Source}$ to the destination node $N_{Destination}$ passes, that is, SW-last is $N_{Destination}$;

3) The type of data communication is categorized, that is, the type of data communication between the nodes are determined between the nodes according to the information on the switching route, and particularly:

Secure communication of data from the transmission source node $N_{Source}$ to the destination node $N_{Destination}$ can be categorized into the following seven types according to a physical connection relationship between the nodes $N_{Source}$ and $N_{Destination}$ and their node types:

Type 1: communication from a switching device to a switching device;

For example, data communication from SW-A to SW-E and SW-D to SW-B in FIG. 1;

Type 2: communication from a switching device to a terminal directly connected to the switching device;

For example, data communication from SW-E to STA1 and SW-G to STA9 in FIG. 1;

Type 3: communication from a switching device to a terminal indirectly connected to the switching device;

For example, data communication from SW-A to STA1 and SW-D to STA6 in FIG. 1;

Type 4: commutation from a terminal to a switching device directly connected to the terminal;

For example, data communication from STA2 to SW-E and STA5 to SW-F in FIG. 1;

Type 5: communication from a terminal to a switching device indirectly connected to the terminal;

For example, data communication from STA2 to SW-F and STA5 to SW-B in FIG. 1;

Type 6: communication from a terminal to another terminal directly connected to the same switching device;

For example, data communication from STA2 to STA3 and STA5 to STA6 in FIG. 1; and Type 7: communication from a terminal to another terminal directly connected to a different switching device;

For example, data communication from STA2 to STA6 and STA5 to STA9 in FIG. 1.

Figure 5:
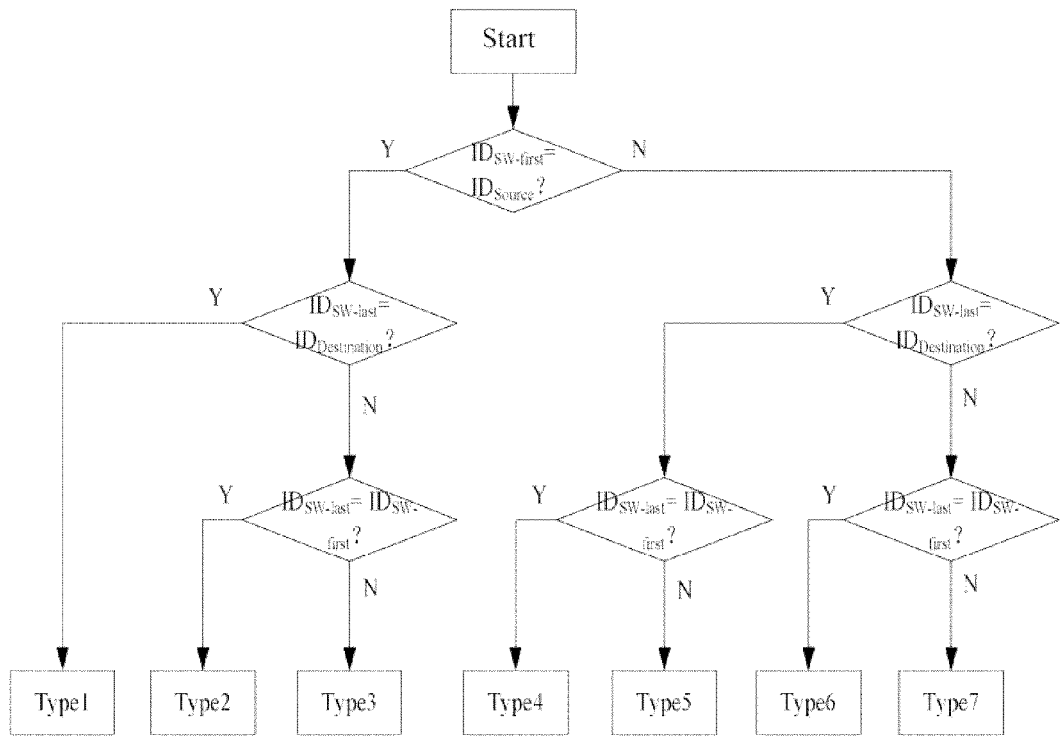
FIG. 5 is a schematic diagram of a flow chart of determining the type of data communication between nodes according to the invention.

The type of data communication from the transmission source node $N_{Source}$ to the destination node $N_{Destination}$ is determined according to the obtained information on the four-tuple [$ID_{Source}$, $ID_{SW\text{-}first}$, $ID_{SW\text{-}last}$, $ID_{Destination}$] of the switching route, and a particular determination flow is as illustrated in FIG. 5. The flow is described as follows:

3.1) It is determined whether $ID_{SW\text{-}first} = ID_{Source}$ holds, and if so, then the transmission source node $N_{Source}$ is a switching device, and the step 3.2) is performed; otherwise, then the transmission source node $N_{Source}$ is a terminal, and the step 3.4) is performed;

3.2) It is determined whether $ID_{SW\text{-}last} = ID_{Destination}$ holds, and if so, then the destination node $N_{Destination}$ is a switching device, and data communication from the transmission source node $N_{Source}$ to the destination node $N_{Destination}$ is communication from a switching device to a switching device and belongs to the type of Type 1; otherwise, the destination node $N_{Destination}$ is a terminal, and the step 3.3) is performed;

3.3) It is determined whether $ID_{SW\text{-}last} = ID_{SW\text{-}first}$ holds, and if so, then data from the transmission source node $N_{Source}$ to the destination node $N_{Destination}$ passes through only one switching device, and data communication from the transmission source node $N_{Source}$ to the destination node $N_{Destination}$ is communication from a switching device to a terminal directly connected to the switching device and belongs to the type of Type 2; otherwise, data from the transmission source node $N_{Source}$ to the destination node $N_{Destination}$ passes through more than two switching devices, and data communication from the transmission source node $N_{Source}$ to the destination node $N_{Destination}$ is communication from a switching device to a terminal indirectly connected to the switching device and belongs to the type of Type 3;

3.4) It is determined whether $ID_{SW\text{-}last} = ID_{Destination}$ holds, and if so, then the destination node $N_{Destination}$ is a switching device, and the step 3.5) is performed; otherwise, the destination node $N_{Destination}$ is a terminal, and the step 3.6) is performed;

3.5) It is determined whether $ID_{SW\text{-}last} = ID_{SW\text{-}first}$ holds, and if so, then data from the transmission source node $N_{Source}$ to the destination node $N_{Destination}$ passes through only one switching device, and data communication from the transmission source node $N_{Source}$ to the destination node $N_{Destination}$ is communication from a terminal to a switching device directly connected to the terminal and belongs to the type of Type 4; otherwise, data from the transmission source node $N_{Source}$ to the destination node $N_{Destination}$ passes through more than two switching devices, and data communication from the transmission source node $N_{Source}$ to the destination node $N_{Destination}$ is communication from a terminal to a switching device indirectly connected to the terminal and belongs to the type of Type 5; and 3.6) It is determined whether $ID_{SW\text{-}last}=ID_{SW\text{-}first}$ holds, and if so, then data from the transmission source node $N_{Source}$ to the destination node $N_{Destination}$ passes through only one switching device, and data communication from the transmission source node $N_{Source}$ to the destination node $N_{Destination}$ is communication from a terminal to another terminal directly connected to the same switching device and belongs to the type of Type 6; otherwise, data from the transmission source node $N_{Source}$ to the destination node $N_{Destination}$ passes through more than two switching devices, and data communication from the transmission source node $N_{Source}$ to the destination node $N_{Destination}$ is communication from a terminal to another terminal directly connected to a different switching device and belongs to the type of Type 7; and 4) Secure communication between the nodes, that is, secure communication between the nodes is performed using a different secure communication strategy according to a different type of data communication between the nodes, and particularly:

For inter-node data communication between the transmission source node $N_{Source}$ and the destination node $N_{Destination}$, a secure communication strategy adopted during communication will vary with a varying type of data communication, and a secure communication strategy particularly adopted for each type of communication is described particularly as follows:

4.1) Type 1: communication from a switching device to a switching device

There is a switch key between every two switching devices in the network (a process of creating a switch key will not be defined or limited in the invention), and a secure communication strategy adopted for data communication of the type of Type 1 is as follows:

4.1.1) The transmitting source node $N_{Source}$ (here the transmitting source node $N_{Source}$ is a switching device and also the first switching device SW-first) encrypts the data packet using the switch key shared between the transmitting source node $N_{Source}$ and the destination node $N_{Destination}$ (here the destination node $N_{Destination}$ is a switching device and also the last switching device SW-last);

4.1.2) If there is intermediate switching device, then the intermediate switching device receives and directly forwards the communication data packet of the type of Type 1; and 4.1.3) The destination node $N_{Destination}$ decrypts the data packet using the switch key shared between the destination node $N_{Destination}$ and the transmitting source node $N_{Source}$.

Figure 6A:
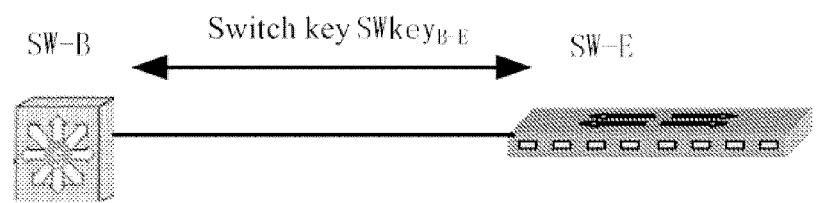
FIG. 6-a is a schematic diagram of communication (adjacent) of a switching device to a switching device (adjacent) according to the invention.
Figure 6B:
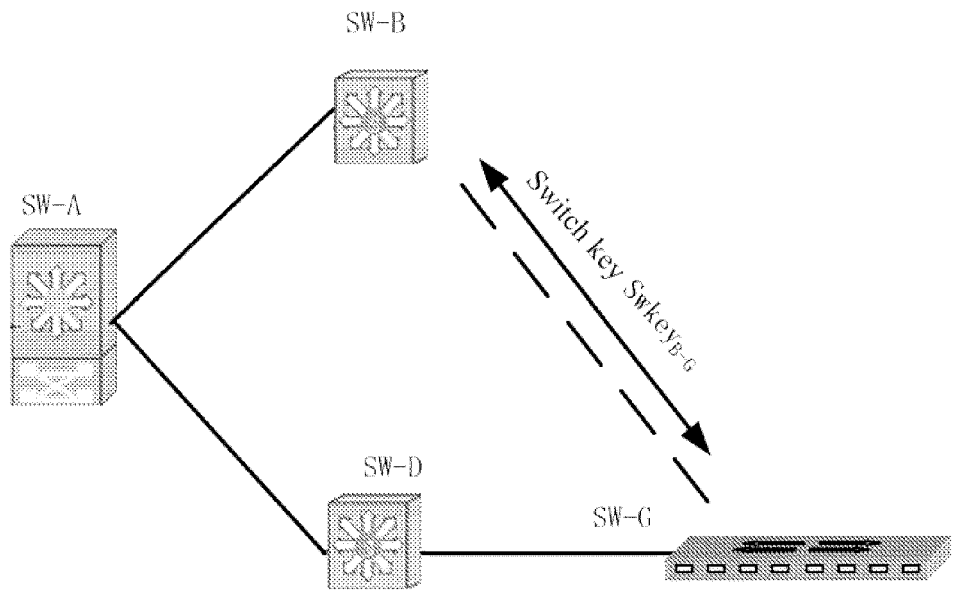

Communication from a switching device to a switching device includes communication from a switching device to an adjacent switching device (communication from the switching device SW-B to the switching device SW-E as illustrated in FIG. 6-a) and communication from a switching device to a nonadjacent switching device (communication from the switching device SW-B to the switching device SW-G as illustrated in FIG. 6-b). In FIG. 6-a the data packet is encrypted and decrypted directly using the switch key $SWkey_{B\text{-}E}$; and in FIG. 6-b, the data packet is encrypted and decrypted directly using the switch key $SWkey_{B\text{-}G}$ and simply forwarded directly through an intermediate switching device (e.g., the switching devices SW-A and SW-D).

4.2) Type 2: communication from a switching device to a terminal directly connected to the switching device There is a unicast session key between a switching device and a terminal directly connected to the switching device in the network (a process of creating a unicast session key will not be defined or limited in the invention), and a secure communication strategy adopted for data communication of the type of Type 2 is as follows:

4.2.1) The transmitting source node $N_{Source}$ (here the transmitting source node $N_{Source}$ is a switching device and also both the first switching device SW-first and the last switching device SW-last) encrypts the data packet using the unicast session key shared between transmitting source node $N_{Source}$ and the destination node $N_{Destination}$ (here a terminal); and 4.2.2) The destination node $N_{Destination}$ decrypts the data packet using the unicast session key shared between the transmitting source node $N_{Source}$ and the destination node $N_{Destination}$.

Figure 7:
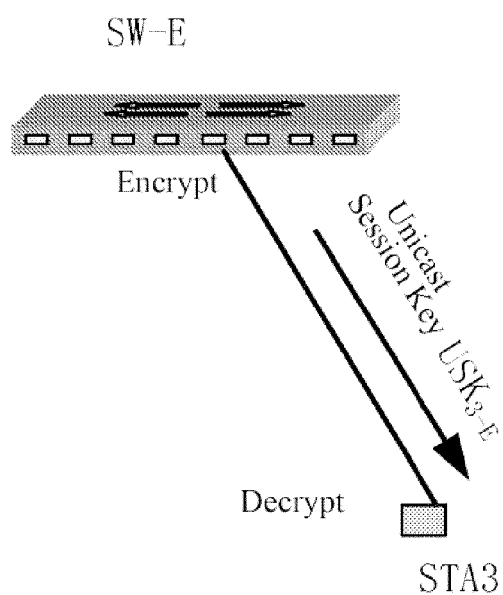
FIG. 7 is a schematic diagram of communication of a switching device to a terminal directly connected to the switching device according to the invention.

As illustrated in FIG. 7, communication from the switching device SW-E to the terminal STA3 belongs to Type 2, the switching device SW-E as the transmission source node encrypts the data packet using the unicast session key $USK_{3\text{-}E}$, and the terminal STA3 as the destination node decrypts the data packet using the unicast session key $USK_{3\text{-}E}$.

4.3) Type 3: communication from a switching device to a terminal indirectly connected to the switching device There are a unicast session key between a switching device and a terminal directly connected to the switching and a switch key between switching devices in the network, and a secure communication strategy adopted for data communication of the type of Type 3 is as follows:

4.3.1) The transmitting source node $N_{Source}$ (here the transmitting source node $N_{Source}$ is a switching device and also the first switching device SW-first) encrypts the data packet using the switch key shared between the transmitting source node $N_{Source}$ and the last switching device SW-last;

4.3.2) If there is intermediate switching device, then the intermediate switching device directly forwards the data packet of the type of Type 3;

4.3.3) The last switching device SW-last decrypts the data packet using the switch key shared between the transmission source node $N_{Source}$ and the last switching device SW-last and then encrypts and then forwards the data packet using the unicast session key shared between the last switching device SW-last and the destination node $N_{Destination}$ (here a terminal); and 4.3.4) The destination node $N_{Destination}$ decrypts the data packet using the unicast session key shared between the last switching device SW-last and the destination node $N_{Destination}$.

Figure 8:
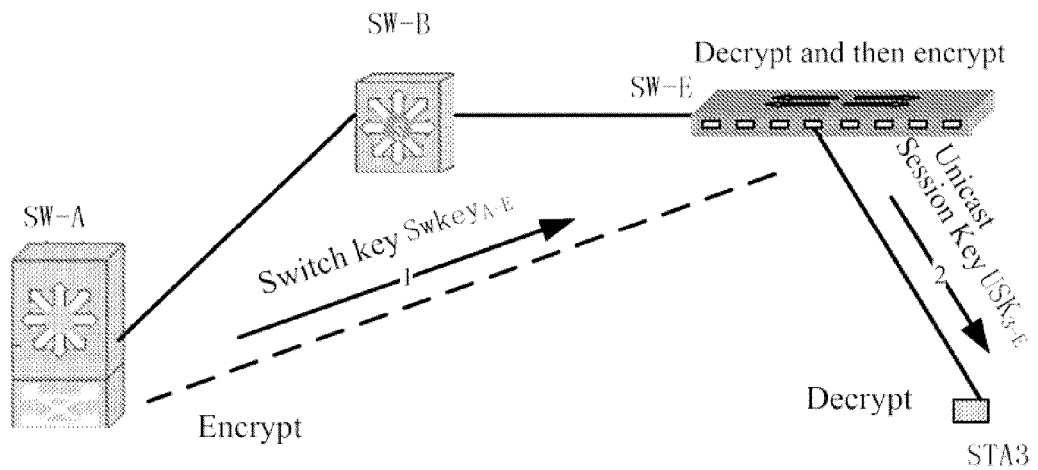
FIG. 8 is a schematic diagram of communication of a switching device to a terminal indirectly connected to the switching device according to the invention.

As illustrated in FIG. 8, communication from the switching device SW-A to the terminal STA3 belongs to Type 3, and SW-E is the last switching device. The switching device SW-A as the transmitting source node encrypts the data packet using the switch key $SWkey_{A\text{-}E}$ shared between SW-A and SW-E; the switching device SW-B belonging to an intermediate switching device directly forwards the data packet; the switching device SW-E as the last switching device decrypts the data packet using the switch key $SWkey_{A\text{-}E}$, then encrypts the data packet using the unicast session key $USK_{3\text{-}E}$ shared between SW-E and the terminal STA3 and then forwards the data packet; and the terminal STA3 as the destination node decrypts the data packet using the unicast session key $USK_{3-E}$.

4.4) Type 4: communication from a terminal to a switching device directly connected to the terminal There is a unicast session key between a terminal and a switching device directly connected to the terminal, and a secure communication strategy adopted for data communication of the type of Type 4 is as follows:

4.4.1) The transmission source node $N_{Source}$ (here a terminal) encrypts the data packet using the unicast session key shared between the transmission source node $N_{Source}$ and the destination node $N_{Destination}$ (here the destination node $N_{Destination}$ is a switching device and also both the first switching device SW-first and the last switching device SW-last); and 4.4.2) The destination node $N_{Destination}$ decrypts the data packet using the unicast session key shared between the transmission source node $N_{Source}$ and the destination node $N_{Destination}$.

Figure 9:
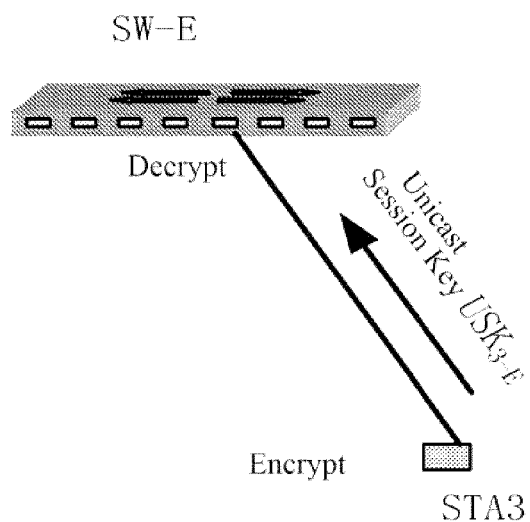
FIG. 9 is a schematic diagram of communication of a terminal to a switching device directly connected to the switching device according to the invention.

As illustrated in FIG. 9, communication from the terminal STA3 to the switching device SW-E belongs to Type 4, and the terminal STA3 as the transmitting source node encrypts the data packet using the unicast session key $USK_{3-E}$; and the switching device SW-E as the destination node decrypts the data packet using the unicast session key $USK_{3-E}$. The data packet is encrypted and decrypted using the unicast session key between the transmitting source node and the destination node for both communication of the type of Type 4 and communication of the type of Type 2, which are different only in their directions.

4.5) Type 5: communication from a terminal to a connected switching device indirectly connected to the terminal There are a unicast session key between a terminal and a switching device indirectly connected to the terminal and a switch key between switching devices in the network, and a secure communication strategy adopted for data communication of the type of Type 5 is as follows:

4.5.1) The transmitting source node $N_{Source}$ (here a terminal) encrypts the data packet using the unicast session key shared between the transmitting source node $N_{Source}$ and the first switching device SW-first;

4.5.2) The first switching device SW-first decrypts the data packet using the unicast session key shared between the transmission source node $N_{Source}$ and the first switching device SW-first, then encrypts the data packet using the switch key shared between the first switching device SW-first and the destination node $N_{Destination}$ (here the destination node $N_{Destination}$ is a switching device and also the last switching device SW-last) and then forwards the data packet;

4.5.3) If there is intermediate switching device, then the intermediate switching device directly forwards the data packet of the type of Type 5; and 4.5.4) The destination node $N_{Destination}$ decrypts the data packet using the switch key shared between the first switching device SW-first and the destination node $N_{Destination}$.

Figure 10:
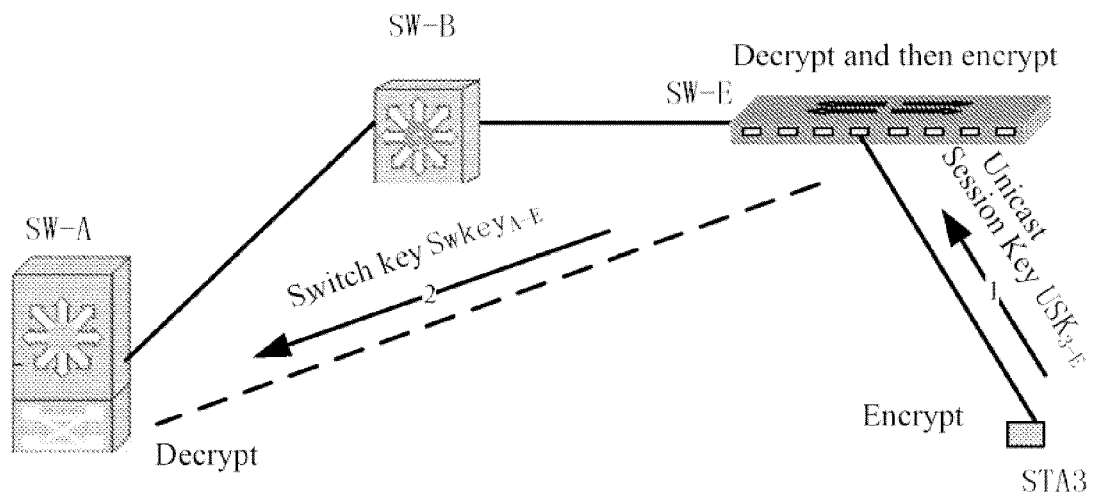
FIG. 10 is a schematic diagram of communication of a terminal to a switching device indirectly connected to the terminal according to the invention.

As illustrated in FIG. 10, communication from the terminal STA3 to the switching device SW-A belongs to Type 5, and SW-E is the first switching device. The terminal STA3 as the transmitting source node encrypts the data packet using the unicast session key $USK_{3-E}$; the switching device SW-E as the first switching device decrypts the data packet using the unicast session key $USK_{3-E}$, then encrypts the data packet using the switch key $SWkey_{A-E}$ shared between the switching device SW-E and the destination node SW-A and then forwards the data packet; and the switching device SW-A as the destination node decrypts the data packet using the switch key $SWkey_{A-E}$ with shared between SW-E and SW-A. The keys are the same for both communication of the type of Type 5 and the communication of the type of Type 3, which are different only in their directions.

3.2.6) Type 6: communication from a terminal to another terminal directly connected to the same switching device There is a unicast session key between a terminal and a switching device directly connected to the terminal and a station key can be created selectively between terminals directly connected to the same switching device according to a local strategy (a process of creating a station key will not be defined or limited according to the invention) in the network. A secure communication strategy adopted for data communication of the type of Type 6 may vary with whether a station key has been created.

4.6.1) A secure communication strategy adopted for data communication of the type of Type 6 with a created station key is as follows:

4.6.1.1) The transmission source node $N_{Source}$ encrypts the data packet using the station key shared between the transmission source node $N_{Source}$ and the destination node $N_{Destination}$ (here a terminal);

4.6.1.2) The first switching device SW-first (here the first switching device SW-first is also the last switching device) directly forwards the data packet of the type of Type 6; and 4.6.1.3) The destination node $N_{Destination}$ decrypts the data packet using the station key shared between the transmission source node $N_{Source}$ and the destination node $N_{Destination}$; and 4.6.2) A secure communication strategy adopted for data communication of the type of Type 6 without any created station key is as follows:

4.6.2.1) The transmission source node $N_{Source}$ encrypts the data packet using the unicast session key shared between the transmission source node $N_{Source}$ and a switching device directly connected to the transmission source node $N_{Source}$;

4.6.2.2) The first switching device SW-first (here the first switching device SW-first is also the last switching device) decrypts the data packet using the unicast session key shared between the transmission source node $N_{Source}$ and the first switching device SW-first, then encrypts the data packet using the unicast session key shared between the first switching device SW-first and the destination node $N_{Destination}$ and then forwards the data packet; and 4.6.2.3) The destination node $N_{Destination}$ decrypts the data packet using the unicast session key shared between the destination node $N_{Destination}$ and the switching device directly connected to the destination node $N_{Destination}$.

Figure 11A:
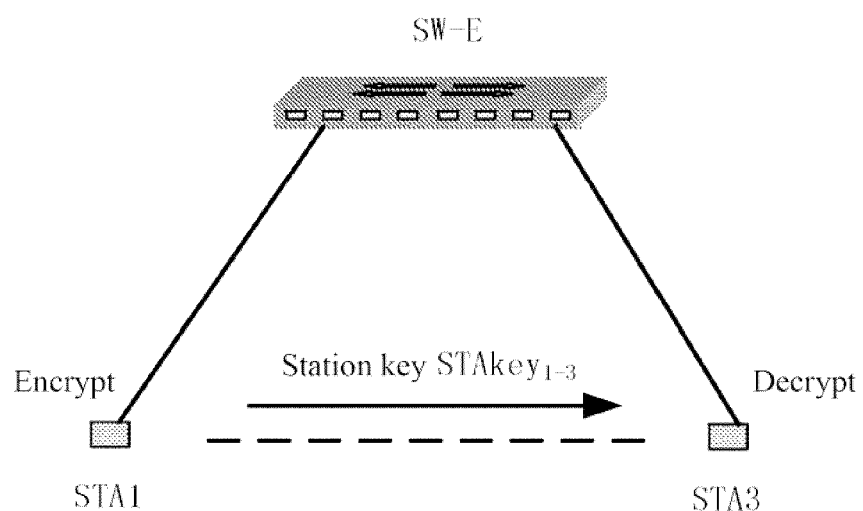
FIG. 11-a is a schematic diagram of communication (with a created station key) of a terminal to another terminal directly connected to the same switching device according to the invention.
Figure 11B:
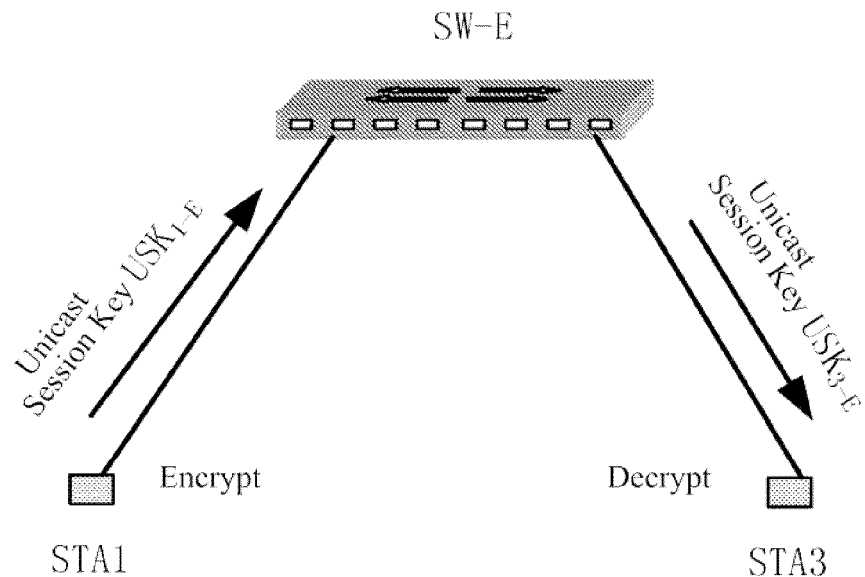

As illustrated in FIG. 11-a and FIG. 11-b, data communication between the terminals STA1 and STA3 belongs to the type of Type 6.

FIG. 11-a illustrates communication with a created station key, and the terminal STA1 as the transmitting source node encrypts the data packet using the station key $STAkey_{1-3}$ shared between STA1 and STA3; the switching device SW-E directly forwards the data packet; and the terminal STA3 as the destination node decrypts the data packet using the station key $STAkey_{1-3}$ shared between STA1 and STA3.

FIG. 11-b illustrates communication without any created station key, and the terminal STA1 as the transmitting source node encrypts the data packet using the unicast session key $USK_{1-E}$ shared between the STA1 and the switching device SW-E; the switching device SW-E decrypts the data packet using the unicast session key $USK_{1-E}$ and then encrypts the data packet using the unicast session key $USK_{3-E}$ and then forwards the data packet; and the terminal STA3 as the destination node decrypts the data packet using the unicast session key $USK_{3-E}$.

4.7) Type 7: communication from a terminal to another terminal directly connected to a different switching device There are a unicast session key between a terminal and a switching device directly connected to the terminal and a switch key between switching devices in the network, and a secure communication strategy adopted for data communication of the type of Type 7 is as follows:

4.7.1) The transmission source node $N_{Source}$ (here a terminal) encrypts the data packet using the unicast session key shared between the transmission source node $N_{Source}$ and the first switching device SW-first;

4.7.2) The first switching device SW-first decrypts the data packet using the unicast session key shared between the transmission source node $N_{Source}$ and the first switching device SW-first, then encrypts the data packet using the switch key shared between the first switching device SW-first and the last switching device SW-last and then forwards the data packet;

4.7.3) If there is intermediate switching device, then the intermediate switching device directly forwards the data packet of the type of Type 7;

4.7.4) The last switching device SW-last decrypts the data packet using the switch key shared between the first switching device SW-first and the last switching device SW-last, then encrypts the data packet using the unicast session key shared between the last switching device SW-last and the destination node $N_{Destination}$ (here a terminal) and then forwards the data packet; and 4.7.5) The destination node $N_{Destination}$ decrypts the data packet using the unicast session key shared between the last switching device SW-last and the destination node $N_{Destination}$.

Figure 12:
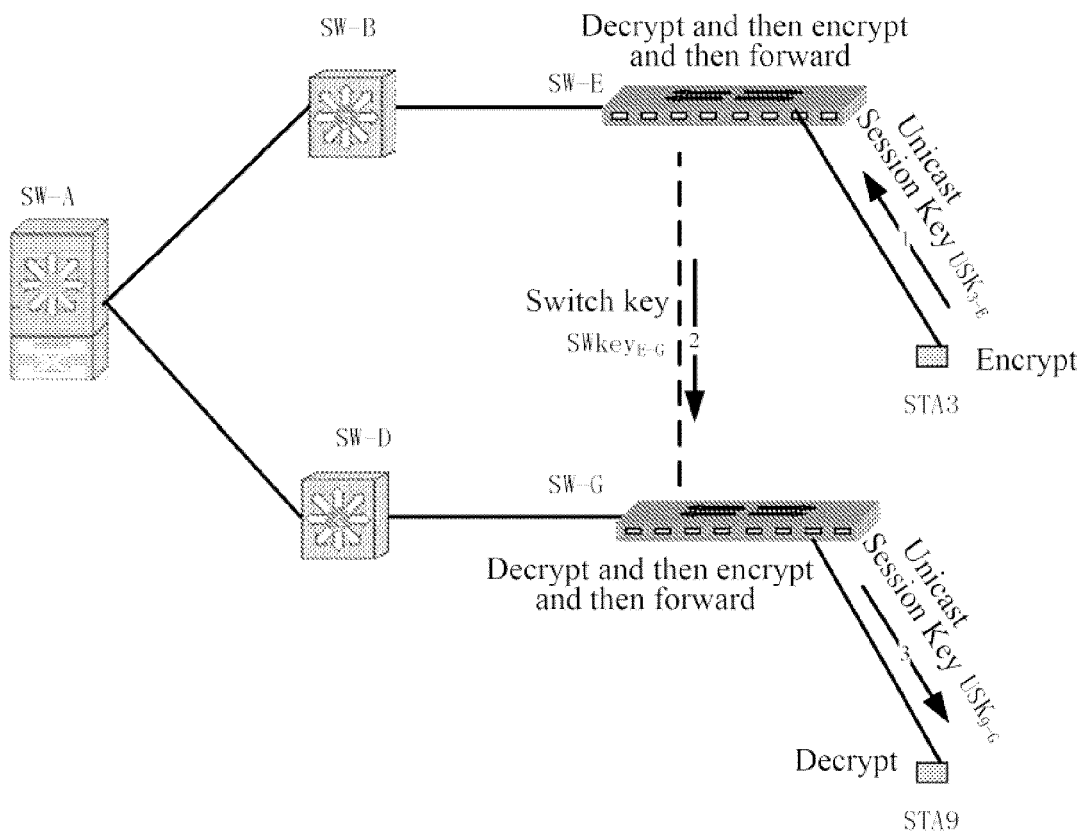
FIG. 12 is a schematic diagram of communication of a terminal to another terminal directly connected to different switching device according to the invention.

As illustrated in FIG. 12, communication from the terminals STA3 to STA9 belongs to the type of Type 7. Communication of the type of Type 7 can be divided into three segments of the transmission source node to the first switching device, the first switching device to the last switching device and the last switching device to the destination node. In FIG. 12, the terminal STA3 as the transmission source node encrypts the data packet using the unicast session key $USK_{3-E}$ shared between the STA3 and the switching device SW-E; the switching device SW-E as the first switching device decrypts the data packet using the unicast session key $USK_{3-E}$ shared between the transmission source node and the SW-E, encrypts the data packet using the switch key $SWkey_{E-G}$ shared between the SW-E and the last switching device SW-G and then forwards the data packet; the switching device SW-D, SW-A and SW-D as the intermediate switching device directly forward the data packet; the switching device SW-G as the last switching device decrypts the data packet using the switch key $SWkey_{E-G}$ shared between the first switching device SW-E and the last switching device SW-G, then encrypts the data packet using the unicast session key $USK_{9-G}$ shared between the SW-G and the destination node and then forwards the data packet; and the terminal STA9 as the destination node decrypts the data packet using the unicast session key $USK_{9-G}$ shared between the last switching device SW-G and the STA9.

A system for secure communication between nodes according to the invention includes a transmission source node $N_{Source}$, a first switching device SW-first, a second switching device SW-last (i.e., a last switching device) and a destination node $N_{Destination}$, where:

The transmission source node $N_{Source}$ is configured to transmit a switching route seeking packet and an encrypted data packet to the destination node $N_{Destination}$, to receive a switching route response packet transmitted from the destination node $N_{Destination}$, and to record information on a switching route from the transmission source node $N_{Source}$ to the destination node $N_{Destination}$ [$ID_{Source}$, $ID_{SW-first}$, $ID_{SW-last}$, $ID_{Destination}$]; the first switching device SW-first is configured to forward the data packet from the transmission source node $N_{Source}$ to the destination node $N_{Destination}$ and to record the information on the switching route from the transmission source node $N_{Source}$ to the destination node $N_{Destination}$ [$ID_{Source}$, $ID_{SW-first}$, $ID_{SW-last}$, $ID_{Destination}$]; the second switching device SW-last is configured to forward the data packet from the transmission source node $N_{Source}$ to the destination node $N_{Destination}$ and to record the information on the switching route from the transmission source node $N_{Source}$ to the destination node $N_{Destination}$ [$ID_{Source}$, $ID_{SW-first}$, $ID_{SW-last}$, $ID_{Destination}$]; and the destination node $N_{Destination}$ is configured to receive the switching route seeking packet and the encrypted packet transmitted from the transmission source node $N_{Source}$, to transmit the switching route response packet to the transmission source node $N_{Source}$, and to record the information on the switching route from the transmission source node $N_{Source}$ to the destination node $N_{Destination}$ [$ID_{Source}$, $ID_{SW-first}$, $ID_{SW-last}$, $ID_{Destination}$], where the information on the switching route from the transmission source node $N_{Source}$ to the destination node $N_{Destination}$ includes $ID_{Source}$, $ID_{SW-first}$, $ID_{SW-last}$ and $ID_{Destination}$.

Preferably the system further includes an intermediate switching device configured to transmit transparently all data packets from the transmission source node $N_{Source}$ to the destination node $N_{Destination}$.

The method for secure communication between nodes according to the invention can categorize different scenarios of communication between nodes and select an appropriate secure communication strategy. A calculation load of a switching device can be reduced and a delay of transmitting a data packet can be shortened as compared with hop-by-hop encryption; and the number of keys can be reduced and key management can be simplified as compared with the method for securing communication confidentiality by creating station keys between every two nodes.

The foregoing description is merely illustrative of preferred embodiments of the invention, and it shall be noted that those ordinarily skilled in the art can further make several adaptations and modifications without departing from the principle of the invention and these adaptations and modifications shall also be construed as coming into the scope of the invention.

The invention claimed is:

1. A method for secure communication between nodes in a wired local area network, comprising:
    1) creating a shared key between nodes comprising between a terminal and a switching device, between every two switching devices and between two terminals directly connected to the same switching device;
    2) seeking a switching route between the nodes to obtain information on the switching route between the nodes;
    3) determining the type of data communication between the nodes according to the information on the switching route; and
    4) performing secure communication between the nodes by using a different secure communication strategy according to a different type of data communication between the nodes;
    wherein the information on the switching route from a transmission source node $N_{Source}$ to a destination node $N_{Destination}$ is defined as a four-tuple of identifiers comprising $ID_{Source}$, $ID_{SW-first}$, $ID_{SW-last}$ and $ID_{Destination}$;

wherein:

$ID_{Source}$: represents the identifier of the transmission source node $N_{Source}$;

$ID_{SW\text{-}first}$: represents the identifier of a first switching device SW-first through which the data packet from the transmission source node $N_{Source}$ to the destination node $N_{Destination}$ passes;

$ID_{SW\text{-}last}$: represents the identifier of a last switching device SW-last through which the data packet from the transmission source node $N_{Source}$ to the destination node $N_{Destination}$ passes;

$ID_{Destination}$: represents the identifier of the destination node $N_{Destination}$ which is a terminal or a switching device.

2. The method for secure communication between nodes in a wired local area network according to claim 1, wherein the step 1) is performed by:

1.1) creating a shared key referred to as a Unicast Session Key, USK, between adjacent nodes;

1.2) creating a shared key referred to as a SWitch key, SWkey, between every two switching devices in the local area network; and 1.3) creating a shared key referred to as a station key, STAkey, between two terminals directly connected to the same switching device according to a selected local strategy.

3. The method for secure communication between nodes in a wired local area network according to claim 1, wherein:

a switching device which receives a data packet from the transmission source node $N_{Source}$ to the destination node $N_{Destination}$ but is absent in the four-tuple of identifiers of the information on the switching route is referred to as an intermediate switching device; and the step 2) is performed by:

2.1) the transmission source node $N_{Source}$ transmitting a switching route seeking packet to the destination node $N_{Destination}$, wherein the packet generally comprises the four-tuple of identifiers;

wherein if the transmission source node $N_{Source}$ is a switching device, then $ID_{SW\text{-}first}$ is $ID_{Source}$; and if the transmission source node $N_{Source}$ is a terminal, then $ID_{SW\text{-}first}$ is the identifier of a switching device directly connected to the transmission source node $N_{Source}$; and the $ID_{SW\text{-}last}$ field is unknown in the switching route seeking packet;

2.2) the destination node $N_{Destination}$ transmitting a switching route response packet to the transmission source node $N_{Source}$; and 2.3) the respective nodes receiving the switching route response packet.

4. The method for secure communication between nodes in a wired local area network according to claim 3, wherein after the destination node $N_{Destination}$ receives the switching route seeking packet transmitted from the transmission source node $N_{Source}$, the step 2.2) is performed by:

2.2.1) determining information on the last switching device SW-last through which the data packet transmitted from the transmission source node $N_{Source}$ passes: if the destination node $N_{Destination}$ is a switching device, then $ID_{SW\text{-}last}$ is $ID_{Destination}$; and if the destination node $N_{Destination}$ is a terminal, then $ID_{SW\text{-}last}$ is the identifier of a switching device directly connected to the terminal;

2.2.2) recording the four-tuple of identifiers, wherein $ID_{Source}$, $ID_{SW\text{-}first}$ and $ID_{Destination}$ are of the same values of respective fields in the received switching route seeking packet, and at this time the values of all the fields of the four-tuple have been definite, wherein the four-tuple of identifiers comprises $ID_{Source}$, $ID_{SW\text{-}first}$, $ID_{SW\text{-}last}$ and $ID_{Destination}$; and 2.2.3) constructing and transmitting a switching route response packet to the transmission source node $N_{Source}$, wherein the packet comprises the four-tuple of identifiers with the definite values of all the fields, wherein the four-tuple of identifiers comprises $ID_{Source}$, $ID_{SW\text{-}first}$, $ID_{SW\text{-}last}$ and $ID_{Destination}$.

5. The method for secure communication between nodes in a wired local area network according to claim 4, wherein after the respective nodes receive the switching route response packet transmitted from the destination node $N_{Destination}$, the step 2.3) is performed by:

2.3.1) the switching device receiving the switching route response packet, and recording the four-tuple of identifiers and then forwarding the packet if its own identifier is present in the four-tuple of identifiers in the packet or directly forwarding the packet if its own identifier is absent in the four-tuple of identifiers in the packet, wherein the four-tuple of identifiers comprises $ID_{Source}$, $ID_{SW\text{-}first}$, $ID_{SW\text{-}last}$ and $ID_{Destination}$; and 2.3.2) the transmission source node $N_{Source}$ recording the four-tuple of identifiers upon reception of the switching route response packet to thereby finish the current switching route seeking process, wherein the four-tuple of identifiers comprises $ID_{Source}$, $ID_{SW\text{-}first}$, $ID_{SW\text{-}last}$ and $ID_{Destination}$.

6. The method for secure communication between nodes in a wired local area network according to claim 5, wherein the step 3) is performed by:

determining the type of data communication from the transmission source node $N_{Source}$ to the destination node $N_{Destination}$ according to the obtained information on the four-tuple, comprising $ID_{Source}$, $ID_{SW\text{-}first}$, $ID_{SW\text{-}last}$ and $ID_{Destination}$, of the switching route, by:

3.1) determining whether $ID_{SW\text{-}first}=ID_{Source}$ holds, and if so, then the transmission source node $N_{Source}$ being a switching device, and performing the step 3.2); otherwise, then the transmission source node $N_{Source}$ being a terminal, and performing the step 3.4);

3.2) determining whether $ID_{SW\text{-}last}=ID_{Destination}$ holds, and if so, then the destination node $N_{Destination}$ being a switching device, and data communication from the transmission source node $N_{Source}$ to the destination node $N_{Destination}$ being communication from a switching device to a switching device and belonging to the type of communication from a switching device to a switching device; otherwise, the destination node $N_{Destination}$ being a terminal, and performing the step 3.3);

3.3) determining whether $ID_{SW\text{-}last}=ID_{SW\text{-}first}$ holds, and if so, then data from the transmission source node $N_{Source}$ to the destination node $N_{Destination}$ passing through only one switching device, and data communication from the transmission source node $N_{Source}$ to the destination node $N_{Destination}$ being communication from a switching device to a terminal directly connected to the switching device and belonging to the type of communication from a switching device to a terminal directly connected to the switching device; otherwise, data from the transmission source node $N_{Source}$ to the destination node $N_{Destination}$ passing through more than two switching devices, and data communication from the transmission source node $N_{Source}$ to the destination node $N_{Destination}$ being communication from a switching device to a terminal indirectly connected to the switching device and belonging to the type of communication from a switching device to a terminal indirectly connected to the switching device;

3.4) determining whether $ID_{SW-last}=ID_{Destination}$ holds, and if so, then the destination node $N_{Destination}$ being a switching device, and performing the step 3.5); otherwise, the destination node $N_{Destination}$ being a terminal, and performing the step 3.6);

3.5) determining whether $ID_{SW-last}=ID_{SW-first}$ holds, and if so, then data from the transmission source node $N_{Source}$ to the destination node $N_{Destination}$ passing through only one switching device, and data communication from the transmission source node $N_{Source}$ to the destination node $N_{Destination}$ being communication from a terminal to a switching device directly connected to the terminal and belonging to the type of communication from a terminal to a switching device directly connected to the terminal; otherwise, data from the transmission source node $N_{Source}$ to the destination node $N_{Destination}$ passing through more than two switching devices, and data communication from the transmission source node $N_{Source}$ to the destination node $N_{Destination}$ being communication from a terminal to a switching device indirectly connected to the terminal and belonging to the type of communication from a terminal to a switching device indirectly connected to the terminal; and 3.6) determining whether $ID_{SW-last}=ID_{SW-first}$ holds, and if so, then data from the transmission source node $N_{Source}$ to the destination node $N_{Destination}$ passing through only one switching device, and data communication from the transmission source node $N_{Source}$ to the destination node $N_{Destination}$ being communication from a terminal to another terminal directly connected to the same switching device and belonging to the type of communication from a terminal to another terminal directly connected to the same switching device; otherwise, data from the transmission source node $N_{Source}$ to the destination node $N_{Destination}$ passing through more than two switching devices, and data communication from the transmission source node $N_{Source}$ to the destination node $N_{Destination}$ being communication from a terminal to another terminal directly connected to a different switching device and belonging to the type of communication from a terminal to another terminal directly connected to a different switching device.

7. The method for secure communication between nodes in a wired local area network according to claim 6, wherein when the type of data communication is the type of communication from a switching device to a switching device, its strategy of secure communication between nodes is performed by:

4.1.1) the transmitting source node $N_{Source}$ encrypting the data packet using the switch key shared between the transmitting source node $N_{Source}$ and the destination node $N_{Destination}$, wherein the transmitting source node $N_{Source}$ is a switching device or the first switching device SW-first, and the destination node $N_{Destination}$ is a switching device or the last switching device SW-last;

4.1.2) if there is intermediate switching device, then the intermediate switching device receiving and directly forwarding the communication data packet of the type of communication from a switching device to a switching device; and 4.1.3) the destination node $N_{Destination}$ decrypting the data packet using the switch key shared between the transmitting source node $N_{Source}$ and the destination node $N_{Destination}$.

8. The method for secure communication between nodes in a wired local area network according to claim 6, wherein when the type of data communication is the type of communication from a switching device to a terminal directly connected to the terminal, its strategy of secure communication between nodes is performed by:

4.2.1) the transmitting source node $N_{Source}$ encrypting the data packet using the unicast session key shared between the transmitting source node $N_{Source}$ and the destination node $N_{Destination}$, wherein the transmitting source node $N_{Source}$ is a switching device, the first switching device SW-first or the last switching device SW-last, and the destination node $N_{Destination}$ is a terminal; and 4.2.2) the destination node $N_{Destination}$ decrypting the data packet using the unicast session key shared between the transmitting source node $N_{Source}$ and the destination node $N_{Destination}$.

9. The method for secure communication between nodes in a wired local area network according to claim 6, wherein when the type of data communication is the type of communication from a switching device to a terminal indirectly connected to the switching device, its strategy of secure communication between nodes is performed by:

4.3.1) the transmitting source node $N_{Source}$ encrypting the data packet using the switch key shared between the transmitting source node $N_{Source}$ and the last switching device SW-last, wherein here the transmitting source node $N_{Source}$ is a switching device or the first switching device SW-first;

4.3.2) if there is intermediate switching device, then the intermediate switching device directly forwarding the data packet of the type of communication from a switching device to a terminal indirectly connected to the switching device;

4.3.3) the last switching device SW-last decrypting the data packet using the switch key shared between the transmission source node $N_{Source}$ and the last switching device SW-last, then encrypting the data packet using the unicast session key shared between the last switching device SW-last and the destination node $N_{Destination}$ and then forwarding the data packet, wherein the destination node $N_{Destination}$ is a terminal; and 4.3.4) the destination node $N_{Destination}$ decrypting the data packet using the unicast session key shared between the last switching device SW-last and the destination node $N_{Destination}$.

10. The method for secure communication between nodes in a wired local area network according to claim 6, wherein when the type of data communication is the type of communication from a terminal to a switching device directly connected to the terminal, its strategy of secure communication between nodes is performed by:

4.4.1) the transmission source node $N_{Source}$ encrypting the data packet using the unicast session key shared between the transmission source node $N_{Source}$ and the destination node $N_{Destination}$, wherein the transmission source node $N_{Source}$ is a terminal, and the destination node $N_{Destination}$ is a switching device, the first switching device SW-first or the last switching device SW-last; and 4.4.2) the destination node $N_{Destination}$ decrypting the data packet using the unicast session key shared between the transmission source node $N_{Source}$ and the destination node $N_{Destination}$.

11. The method for secure communication between nodes in a wired local area network according to claim 6, wherein when the type of data communication is the type of communication from a terminal to a switching device indirectly connected to the terminal, its strategy of secure communication between nodes is performed by:

4.5.1) the transmitting source node $N_{Source}$ encrypting the data packet using the unicast session key shared between the transmitting source node $N_{Source}$ and the first switching device SW-first, wherein the transmitting source node $N_{Source}$ is a terminal;

4.5.2) the first switching device SW-first decrypting the data packet using the unicast session key shared between the transmission source node $N_{Source}$ and the first switching device SW-first, then encrypting the data packet using the switch key shared between the first switching device SW-first and the destination node $N_{Destination}$ and then forwarding the data packet, wherein the destination node $N_{Destination}$ is a switching device or the last switching device SW-last;

4.5.3) if there is intermediate switching device, then the intermediate switching device directly forwards the data packet of the type of communication from a terminal to a switching device indirectly connected to the terminal; and 4.5.4) the destination node $N_{Destination}$ decrypting the data packet using the switch key shared between the destination node $N_{Destination}$ and the first switching device SW-first.

12. The method for secure communication between nodes in a wired local area network according to claim 6, wherein when the type of data communication is the type of communication from a terminal to another terminal directly connected to the same switching device, its strategy of secure communication between nodes is performed by:

4.6.1) adopting a secure communication strategy as follows for the type of communication from a terminal to another terminal directly connected to the same switching device with a created station key:

4.6.1.1) the transmission source node $N_{Source}$ encrypts the data packet using the station key shared between the transmission source node $N_{Source}$ and the destination node $N_{Destination}$, wherein the destination node $N_{Destination}$ is a terminal;

4.6.1.2) the first switching device SW-first directly forwards the data packet of the type of communication from a terminal to another terminal directly connected to the same switching device, wherein the first switching device SW-first is also the last switching device SW-last; and 4.6.1.3) the destination node $N_{Destination}$ decrypts the data packet using the station key shared between the transmission source node $N_{Source}$ and the destination node $N_{Destination}$; and 4.6.2) adopting a secure communication strategy as follows for the type of communication from a terminal to another terminal directly connected to the same switching device without any created station key:

4.6.2.1) the transmission source node $N_{Source}$ encrypts the data packet using the unicast session key shared between the transmission source node $N_{Source}$ and a switching device directly connected to the transmission source node $N_{Source}$;

4.6.2.2) the first switching device SW-first decrypts the data packet using the unicast session key shared between the transmission source node $N_{Source}$ and the first switching device SW-first, then encrypts the data packet using the unicast session key shared between the first switching device SW-first and the destination node $N_{Destination}$ and then forwards the data packet, wherein the first switching device SW-first is also the last switching device SW-last; and 4.6.2.3) the destination node $N_{Destination}$ decrypts the data packet using the unicast session key shared between the destination node $N_{Destination}$ and the switching device directly connected to the destination node $N_{Destination}$.

13. The method for secure communication between nodes in a wired local area network according to claim 6, wherein when the type of data communication is the type of communication from a terminal to another terminal directly to a different switching device, its strategy of secure communication between nodes is performed by:

4.7.1) the transmission source node $N_{Source}$ encrypting the data packet using the unicast session key shared between the transmission source node $N_{Source}$ and the first switching device SW-first, wherein the transmission source node $N_{Source}$ is a terminal;

4.7.2) the first switching device SW-first decrypting the data packet using the unicast session key shared between the transmission source node $N_{Source}$ and the first switching device SW-first, then encrypting the data packet using the switch key shared between the first switching device SW-first and the last switching device SW-last and then forwarding the data packet;

4.7.3) if there is intermediate switching device, then the intermediate switching device directly forwarding the data packet of the type of communication from a terminal to another terminal directly connected to a different switching device;

4.7.4) the last switching device SW-last decrypting the data packet using the switch key shared between the first switching device SW-first and the last switching device SW-last, then encrypting the data packet using the unicast session key shared between the last switching device SW-last and the destination node $N_{Destination}$ and then forwarding the data packet, wherein the destination node $N_{Destination}$ a terminal; and 4.7.5) the destination node $N_{Destination}$ decrypting the data packet using the unicast session key shared between the last switching device SW-last and the destination node $N_{Destination}$.

14. A system for secure communication between nodes in a wired local area network comprising a transmission source node $N_{Source}$, a first switching device SW-first, a second switching device SW-last and a destination node $N_{Destination}$, wherein a shared key is created between nodes comprising between a terminal and a switching device, between every two switching devices and between two terminals directly connected to the same switching device, and wherein:

the transmission source node $N_{Source}$ is configured to transmit a switching route seeking packet and an encrypted data packet to the destination node $N_{Destination}$, to receive a switching route response packet transmitted from the destination node $N_{Destination}$, to record information on a switching route from the transmission source node $N_{Source}$ to the destination node $N_{Destination}$, to determine the type of data communication from the transmission source node $N_{Source}$ to the destination node $N_{Destination}$, and to perform secure communication between the nodes by using a corresponding secure communication strategy according to the type of data communication;

the first switching device SW-first is configured to forward the data packet from the transmission source node $N_{Source}$ to the destination node $N_{Destination}$, to record the information on the switching route from the transmission source node $N_{Source}$ to the destination node $N_{Destination}$, to determine the type of data communication from the transmission source node $N_{Source}$ to the destination node $N_{Destination}$, and to perform secure communication between the nodes by using a corresponding secure communication strategy according to the type of data communication;

the second switching device SW-last is configured to forward the data packet from the transmission source node $N_{Source}$ to the destination node $N_{Destination}$, to record the information on the switching route from the transmission source node $N_{Source}$ to the destination node $N_{Destination}$, to determine the type of data communication from the transmission source node $N_{Source}$ to the destination node $N_{Destination}$, and to perform secure communication between the nodes by using a corresponding secure communication strategy according to the type of data communication, the destination node $N_{Destination}$ is configured to receive the switching route seeking packet and the encrypted data packet transmitted from the transmission source node $N_{Source}$, to transmit the switching route response packet to the transmission source node $N_{Source}$, to record the information on the switching route from the transmission source node $N_{Source}$ to the destination node $N_{Destination}$, to determine the type of data communication from the transmission source node $N_{Source}$ to the destination node $N_{Destination}$, and to perform secure communication between the nodes by using a corresponding secure communication strategy according to the type of data communication;

wherein the information on the switching route from the transmission source node $N_{Source}$ to the destination node $N_{Destination}$ comprises $ID_{Source}$, $ID_{SW\text{-}first}$, $ID_{SW\text{-}last}$ and $ID_{Destination}$;

wherein:
$ID_{Source}$: represents the identifier of the transmission source node $N_{Source}$;
$ID_{SW\text{-}first}$: represents the identifier of a first switching device SW-first through which the data packet from the transmission source node $N_{Source}$ to the destination node $N_{Destination}$ passes;
$ID_{SW\text{-}last}$: represents the identifier of a last switching device SW-last through which the data packet from the transmission source node $N_{Source}$ to the destination node $N_{Destination}$ passes;
$ID_{Destination}$: represents the identifier of the destination node $N_{Destination}$ which is a terminal or a switching device.

15. The system for secure communication between nodes in a wired local area network according to claim 14, further comprising:
an intermediate switching device configured to transmit transparently all data packets from the transmission source node $N_{Source}$ to the destination node $N_{Destination}$.

* * * * *

UNITED STATES PATENT AND TRADEMARK OFFICE
CERTIFICATE OF CORRECTION

PATENT NO.       : 8,966,257 B2  
APPLICATION NO.  : 13/516967  
DATED            : February 24, 2015  
INVENTOR(S)      : Tie et al.

Page 1 of 1

It is certified that error appears in the above-identified patent and that said Letters Patent is hereby corrected as shown below:

<u>On the Title Page</u>:

Under "(75) Inventors", please delete "Oin Li" and insert --Qin Li-- therefor.

Signed and Sealed this  
Fifth Day of January, 2016

Michelle K. Lee  
*Director of the United States Patent and Trademark Office*